United States Patent
Kawai

(10) Patent No.: US 12,314,059 B2
(45) Date of Patent: May 27, 2025

(54) WORK MACHINE AND INFORMATION MANAGEMENT APPARATUS

(71) Applicant: HONDA MOTOR CO., LTD., Tokyo (JP)

(72) Inventor: Toru Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 405 days.

(21) Appl. No.: 17/514,502

(22) Filed: Oct. 29, 2021

(65) Prior Publication Data

US 2022/0147056 A1  May 12, 2022

(30) Foreign Application Priority Data

Nov. 9, 2020 (JP) .................... 2020-186705

(51) Int. Cl.
- G05D 1/00 (2024.01)
- A01D 34/00 (2006.01)
- A01D 101/00 (2006.01)

(52) U.S. Cl.
CPC .......... *G05D 1/0278* (2013.01); *G05D 1/028* (2013.01); *A01D 34/008* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 10,864,891 | B2 | 12/2020 | Haneda et al. |
| 11,531,338 | B2 * | 12/2022 | O'Donnell ........... G05D 1/0061 |
| 2009/0140926 | A1 * | 6/2009 | Traster .................... G01S 15/86 342/463 |
| 2016/0165795 | A1 * | 6/2016 | Balutis ................. G05D 1/0044 701/25 |
| 2017/0026818 | A1 * | 1/2017 | Beaulieu ............... A01D 34/008 |
| 2019/0204095 | A1 * | 7/2019 | Anderson .......... G01C 21/3407 |
| 2019/0315314 | A1 | 10/2019 | Haneda et al. |
| 2020/0037499 | A1 * | 2/2020 | Ko ........................ G05D 1/0088 |
| 2020/0275605 | A1 * | 9/2020 | Chen ........................ G01S 19/14 |
| 2020/0347581 | A1 * | 11/2020 | Shimamura ............. E02F 9/262 |
| 2021/0100160 | A1 * | 4/2021 | Kang ................... G05D 1/0238 |
| 2021/0165109 | A1 * | 6/2021 | Yang .................... G05D 1/0221 |
| 2021/0378172 | A1 * | 12/2021 | Ackerman ............. G05D 1/028 |
| 2022/0007570 | A1 * | 1/2022 | Foster .................... A01D 34/78 |

FOREIGN PATENT DOCUMENTS

JP  2018-109849 A  7/2018

\* cited by examiner

*Primary Examiner* — James J Lee
*Assistant Examiner* — Melanie G Huber
(74) *Attorney, Agent, or Firm* — THOMAS | HORSTEMEYER, LLP

(57) ABSTRACT

A work machine which includes a GNSS sensor that detects a GNSS signal and a beacon signal detection sensor that detects a signal of a beacon, and which is a self-propelled work machine that performs work in a work region based on results of detection by the GNSS sensor and the beacon signal detection sensor, the work machine comprising a specification unit configured to specify a region in which accuracy of specifying a self-position of the work machine based on the GNSS sensor is lower than a reference in the work region, and a notification unit configured to notify a user of an installation position of a marker based on a result of specification by the specification unit.

8 Claims, 4 Drawing Sheets

WORK MACHINE AND INFORMATION MANAGEMENT APPARATUS

CROSS-REFERENCE TO RELATED APPLICATION(S)

This application claims priority to and the benefit of Japanese Patent Application No. 2020-186705 filed on Nov. 9, 2020, the entire disclosure of which is incorporated herein by reference.

BACKGROUND OF THE INVENTION

Field of the Invention

The present invention mainly relates to a work machine.

Description of the Related Art

A plurality of types of sensors can be used for travel control of a self-propelled work machine in accordance with use applications and the like. Japanese Patent Laid-Open No. 2018-109849 exemplifies a GNSS signal receiver, a beacon receiver, and the like as sensors included in a lawn mower which is an example of a work machine.

The above-described sensors are used to specify the self-position of the work machine, and a further contrivance can be required for their utilization mode in order to improve work efficiency.

SUMMARY OF THE INVENTION

The present invention improves work efficiency of a work machine.

One of the aspects of the present invention provides a work machine which includes a GNSS sensor that detects a GNSS signal and a beacon signal detection sensor that detects a signal of a beacon, and which is a self-propelled work machine that performs work in a work region based on results of detection by the GNSS sensor and the beacon signal detection sensor, the work machine comprising a specification unit configured to specify a region in which accuracy of specifying a self-position of the work machine based on the GNSS sensor is lower than a reference in the work region, and a notification unit configured to notify a user of an installation position of a marker based on a result of specification by the specification unit.

Further features of the present invention will become apparent from the following description of exemplary embodiments with reference to the attached drawings.

DESCRIPTION OF THE EMBODIMENTS

Figure 1:
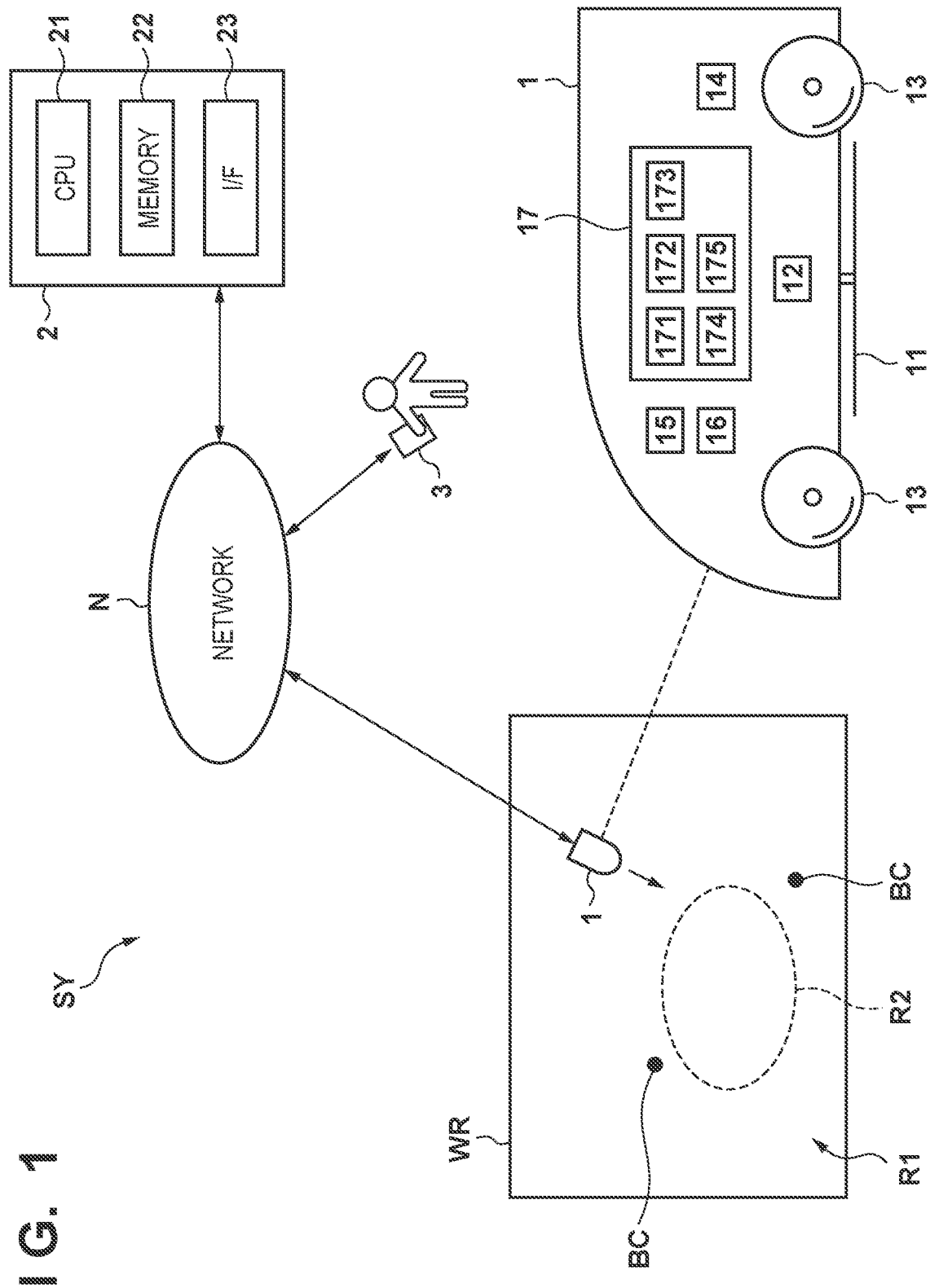
FIG. 1 is a diagram showing a configuration example of a work system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration Example of Work System)

FIG. 1 shows a configuration example of a work system SY according to an embodiment. The work system SY includes a work machine 1, an information management apparatus 2, and a terminal 3. In the present embodiment, the work machine 1 is a self-propelled work machine or an unmanned traveling work machine, and performs work in a work region WR based on a predetermined program. In the present embodiment, the work machine 1 is a lawn mower that performs lawn mowing work. Meanwhile, as another embodiment, the work machine 1 may be, for example, a snow blower that performs snow removal work, or an agricultural work machine that performs agricultural work.

The information management apparatus 2 is a server configured to be capable of communicating with the work machine 1 via a network N. The information management apparatus 2 includes a CPU 21, a memory 22, and a communication interface 23, and manages work information on the work machine 1 by these components. The memory 22 functions as a storage unit, and includes a read only memory (ROM), an electrically erasable programmable read only memory (EEPROM), a random access memory (RAM), and the like. Although details will be described later, examples of the work information include information indicating a work time (for example, a work start time, a work end time, and the like), information indicating a work target (for example, the shape of the work region WR, a portion of the work region WR that requires work, and the like), and information indicating work accuracy (for example, the allowable amount of work errors, and the like).

The terminal 3 is a communication device (for example, a smartphone) configured to be capable of communicating with the information management apparatus 2 via the network N. For example, the user can set or input the work information or change the work information by using the terminal 3. The user is typically the owner of the work machine 1, but may be a person other than the owner, for example, a person who substantially uses the work machine 1, a person who temporarily uses the work machine 1, or the like.

Thus, in the work system SY, the work machine 1, the information management apparatus 2, and the terminal 3 can perform work desired for the work region WR while communicating with each other. As another embodiment, the function of the information management apparatus 2 may be provided in the work machine 1 and/or the terminal 3, and the work system SY may include the work machine 1 and the terminal 3. As still another embodiment, the function of the terminal 3 may be provided in the work machine 1 and/or the information management apparatus 2, and the work system SY may include the work machine 1 and the information management apparatus 2.

(Configuration Example of Work Machine)

The work machine 1 includes a work unit 11, a work control unit 12, a traveling unit 13, and a traveling control unit 14. The work unit 11 is capable of actually performing work (lawn mowing in the present embodiment). A lawn mowing blade movable up and down is used at the work unit 11. For example, during the execution of the work, the work unit 11 is lowered to perform the lawn mowing (operation state), and during the pause of the work, the work unit 11 is raised to suppress the lawn mowing work (pause state).

The work control unit 12 controls driving of the work unit 11, and for example, controls driving of an electric motor provided in a lawn mowing blade by a motor driver. With such a configuration, the work control unit 12 lifts and lowers the work unit 11, drives the work unit 11, and adjusts the driving force.

The traveling unit 13 refers to wheels for causing the work machine 1 (main body of the work machine 1) to travel. In the present embodiment, a pair of rear wheels as drive wheels and a pair of front wheels as driven wheels are used as the traveling unit 13. Meanwhile, as another embodiment, another traveling mechanism such as a crawler traveling body (crawler traveling mechanism) may be used as the traveling unit 13.

The traveling control unit 14 controls driving of the traveling unit 13, and for example, controls driving of an electric motor provided in a driving wheel by the motor driver. According to such a configuration, the traveling control unit 14 causes forward movement, backward movement, left turn, right turn, pivot turn, and spin turn of the work machine 1, and freely changes the traveling direction and traveling speed of the work machine 1 and the orientation/posture of the work machine 1 in the work region WR.

The work machine 1 further includes a GNSS sensor 15, a beacon signal detection sensor 16, and a system controller 17. The GNSS sensor 15 detects a global navigation satellite system (GNSS) signal, and can acquire position coordinates (coordinates on map data) of the detection point as the self-position of the work machine 1.

The beacon signal detection sensor 16 detects a signal of a beacon BC. The beacon signal detection sensor 16 may be a reception device capable of measuring a distance from the work machine 1 to the beacon BC or a detection device capable of detecting the amount of attenuation of signal strength of the beacon BC, the number of sine waves generated by the beacon BC, or the like. From a similar point of view, the beacon BC may be configured to generate, as a signal source (signal transmitter), a signal that allows the beacon signal detection sensor 16 (signal receiver) to specify a distance to the signal source. As will be described in detail later, the beacon BC is installed by the user in the work region WR, and the work machine 1 performs the work in the work region WR while specifying the self-position in the work region WR based on the results of detection by the GNSS sensor 15 and the beacon signal detection sensor 16.

The system controller 17 is capable of controlling the entire system of the work machine 1, and functions as an acquisition unit 171, a specification unit 172, a calculation unit 173, a notification unit 174, and a determination unit 175 described later. In the present embodiment, the system controller 17 is a computer including a central processing unit (CPU), a memory, and a communication interface. Meanwhile, as another embodiment, the system controller 17 may include a semiconductor device such as an application specific integrated circuit (ASIC). That is, the function of the system controller 17 described below can be implemented by either hardware or software.

The acquisition unit 171 acquires the above-described work information (information indicating work time, information indicating work target, information indicating work accuracy, and the like) input by the user using the terminal 3. From this viewpoint, the acquisition unit 171 has a function of a communication interface that acquires the work information from the terminal 3 via the network N, a function of storing the work information in the memory, and a function of reading the work information from the memory.

The specification unit 172 specifies a region R1 in which the GNSS sensor can specify the self-position with high accuracy and a region R2 in which the GNSS sensor 15 does not specify the self-position in the work region WR. That is, the region R1 corresponds to a region in which the detection intensity of the GNSS signal detected by the GNSS sensor 15 is equal to or higher than the reference, and the region R2 corresponds to a region in which the detection intensity of the GNSS signal detected by the GNSS sensor 15 is lower than the reference. Although details will be described later, in the region R1, the work machine 1 can specify the self-position with high accuracy, so that it can be said that the work machine 1 can realize work with desired work accuracy. On the other hand, in the region R2, the work machine 1 may find difficulty in determining the self-position, so that the work machine 1 may find difficulty in realizing work with desired work accuracy.

The calculation unit 173 performs predetermined calculation processing for the work unit 11 to perform work, and for example, calculates position where the beacon BC is to be installed (hereinafter, it may be simply referred to as the "installation position of the beacon BC"), details of which will be described later. When the beacon BC is installed by the user on the basis of the results of calculations by the calculation unit 173, the work machine 1 can appropriately execute the work while specifying the self-position by detecting the signal of the beacon BC using the beacon signal detection sensor 16 in the region R2.

The notification unit 174 notifies the user that the beacon BC should be installed in the region R2 on the basis of the results of calculations by the calculation unit 173. If there is a plurality of types of beacons BC, the notification unit 174 can designate which of the beacons BC to be installed as well as designating the installation position of the beacon BC. Although details will be described later, the installation position of the beacon BC may be in either the region R1 or the region R2, or may be at a boundary portion thereof. The notification is performed by outputting a predetermined notification signal to the terminal 3. In the present embodiment, the notification is performed by transmission of map data, but may be performed by transmission of a mail in another embodiment.

The determination unit 175 determines whether it is necessary to update the regions R1 and R2 specified by the specification unit 172. For example, the detection intensity of the GNSS sensor 15 may be subsequently changed due to an object being installed later in the work region WR, a building being constructed later around the work region WR, or the like. In such a case, preferably, the notification unit 174 makes a notification on the basis of the results of determination by the determination unit 175, and the installation position of the beacon BC is corrected by the user in accordance with the notification. The determination unit 175 can perform the determination during execution of the work by the work machine 1.

In the present embodiment, the system controller 17 is provided separately from the work control unit 12 and the traveling control unit 14 described above in order to facilitate the following description, but they may be integrally configured. Alternatively, the system controller 17 can control driving of the work unit 11 by the work control unit 12 and control driving of the traveling unit 13 by the traveling control unit 14.

(Example of Installation Mode of Beacons in Work Region)

The beacon BC may be installed in the region R2 such that any position in the region R2 can be specified, and the installation position of the beacon BC may be either in the region R1 or the region R2, or may be at a boundary portion between these regions. The beacon BC needs to be attached at a predetermined height and, for example, can be attached to the top of an installation object that can be relatively easily installed, such as a pole or a triangular cone.

Figure 2:
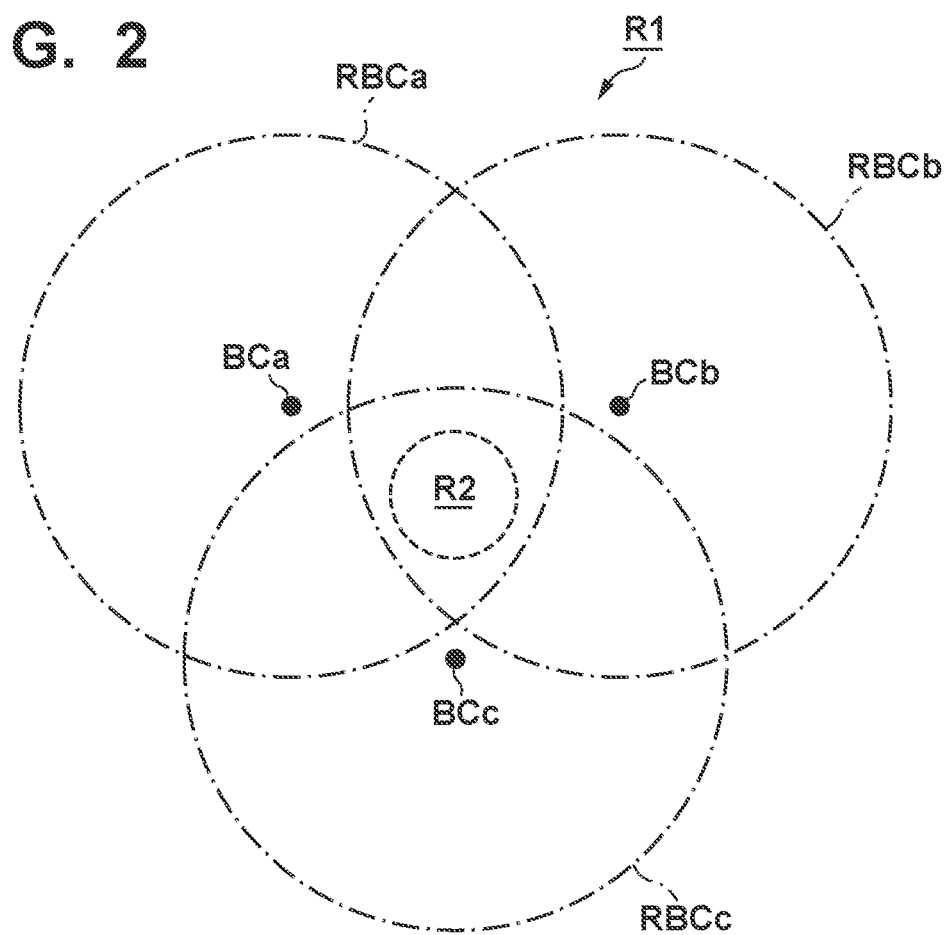
FIG. 2 is a diagram showing an example of an installation mode of beacons.

FIG. 2 illustrates an example of an installation mode of the beacons BC. In this example, a plurality of beacons BCa, BCb, and BCc is installed in the region R1 (if they are not particularly distinguished, they are simply indicated as "beacons BC"). In the present embodiment, the beacon signal detection sensor 16 can measure the distance from the work machine 1 to each beacon BC. Therefore, if the position coordinates (coordinates on the map data) of each beacon BC are specified, or if the coordinates of each beacon are specified by the GNSS sensor installed in the beacon, the work machine 1 can calculate or specify its self-position based on the relative position with respect to each beacon BC (the distance to each beacon BC).

Here, FIG. 2 indicates regions satisfying the signal intensities of the beacons BCa, BCb, and BCc detectable by the beacon signal detection sensor 16 as regions RBCa, RBCb, and RBCc, respectively. For example, the region RBCa corresponds to a region in which the beacon signal detection sensor 16 can detect the signal of the beacon BCa. In short, the work machine 1 can appropriately detect the signal of the beacon BCa by the beacon signal detection sensor 16 in the region RBCa, but finds difficulty in appropriately detecting the signal of the beacon BCa by the beacon signal detection sensor 16 outside the region RBCa.

As can be seen from FIG. 2, the region R2 is included in a region where the regions RBCa, RBCb, and RBCc overlap with one another. As a result, in a case where the position coordinates of each beacon BC are specified, the work machine 1 can appropriately calculate or specify the self-position by the beacon signal detection sensor 16 even if the work machine 1 is located anywhere in the region R2.

Figure 3:
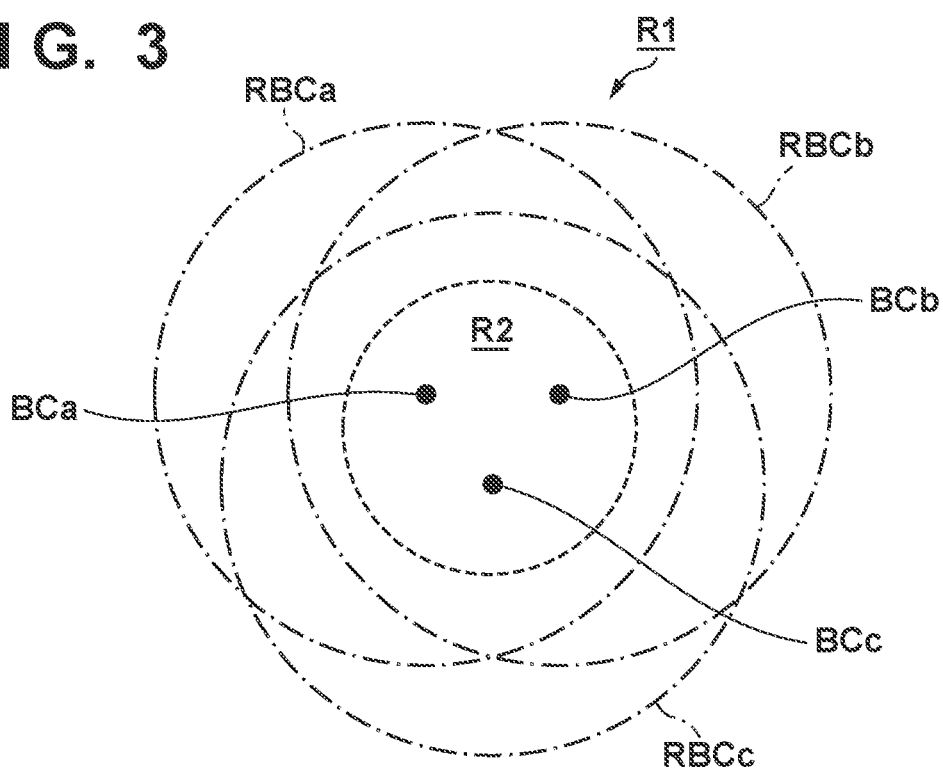
FIG. 3 is a diagram showing an example of an installation mode of beacons.

The beacons BCa, BCb, and BCc may be installed such that their position coordinates are accurately reflected on the map data and the region R2 is included in a region where the regions RBCa, RBCb, and RBCc overlap with one another. Therefore, the beacons BCa, BCb, and BCc may be installed in the region R1 as illustrated in FIG. 2, may be installed in the region R2 as illustrated in FIG. 3, or may be installed at a boundary portion between these regions.

In the present embodiment, the specification of the self-position is performed on the basis of the signals of the three beacons BCa, BCb, and BCc. However, the specification may be performed on the basis of trigonometry. Therefore, in another embodiment, the number of beacons BC may be four or more. In that case, the signal intensities of at least two (preferably three) beacons BC can be detected by the beacon signal detection sensor 16 in any portion of the region R2. In still another embodiment, if the signal generated by the beacon BC is configured to have a plurality of signals or information including directivity and coordinates, the number of beacon(s) BC may be one or two.

(Method for Determining Installation Positions of Beacons)

In the present embodiment, the state of the work machine 1 can be divided into a "preparatory (or non-workable)" state and a "ready (or workable)" state. For example, the "preparatory" state includes a state in which installation (or update) of the beacons BC is necessary, and the "ready" state includes a state in which the installation of the beacons BC is unnecessary and a state in which the installation of the beacons BC is necessary and completed.

Figure 4:
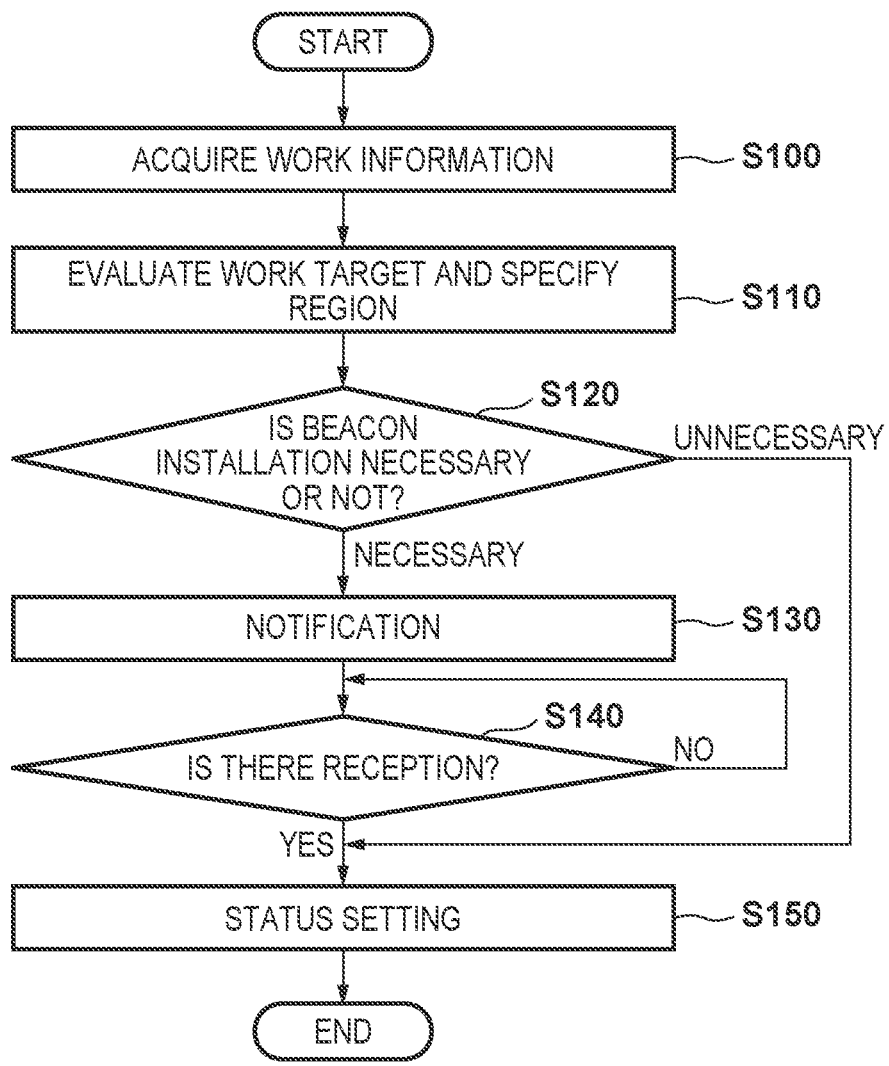
FIG. 4 is a flowchart showing an example of a method of determining installation positions of beacons.

FIG. 4 is a flowchart illustrating an example of a method for determining the installation positions of the beacons BC when the work machine 1 is in the "preparatory" state. The process in the flowchart is mainly implemented by the system controller 17 and/or the information management apparatus 2. The outline of the process is to specify the region R2 in which the detection intensity of the GNSS sensor 15 is less than the reference, and install the beacons BC in the specified region R2.

In step S100 (hereinafter, simply referred to as S100, and the same applies to other steps to be described below), the acquisition unit 171 acquires the work information. The work information includes information indicating a work time (for example, a work start time, a work end time, and the like), information indicating a work target (for example, the shape of the work region WR, a portion of the work region WR that requires work, and the like), information indicating work accuracy (for example, the allowable amount of work errors), and the like. In the following description, the information indicating a work time is referred to as information i1, the information indicating a work target is referred to as information i2, and the information indicating work accuracy is referred to as information i3.

In step S110, the work target is evaluated by causing the work machine 1 to sequentially travel in the work region WR based on the information i2 indicating the work target. Specifically, the specification unit 172 specifies the region R2 in which the detection intensity of the GNSS sensor 15 is less than the reference, and concomitantly specifies the region R1 in which the detection intensity of the GNSS sensor 15 is equal to or greater than the reference. A region in which the detection intensity of the GNSS sensor 15 is equal to the reference may be set as the region R2 (that is, a region in which the detection intensity is less than or equal to the reference may be set as the region R2, and a region in which the detection intensity is greater than the reference may be set as the region R1).

The travel route at the time of evaluating the work target may be set on the basis of a predetermined algorithm as long as the outer shape of the region R2 can be specified. For example, the travel route may be set so as to repeat reciprocations in the work region WR in a predetermined direction, or may be set so as to sequentially go around from the outer periphery toward the center of the work region WR. In another embodiment, the work target may be evaluated by the user himself/herself, for example, by using a predetermined instrument for measuring the intensity of the GNSS signal.

In step S120, the calculation unit 173 calculates the installation position of the beacons BC based on the specified region R2 and the information i3 indicating the work accuracy, and determines whether the installation of the beacons BC is necessary. When it is necessary to install the beacons BC, the process proceeds to step S130, and when it is unnecessary to install the beacons BC, the process proceeds to step S150. Then, the work machine 1 is set to the "ready" state, and the process in this flowchart is ended.

As described above, in the present embodiment, if the work accuracy is allowed to be relatively low, the installation of the beacons BC can be omitted so that it is determined in step S120 that the installation of the beacons BC is unnecessary. Therefore, in another embodiment, if the work accuracy is allowed to be relatively low, the reference for specifying the region R2 (concomitantly, the region R1) may be set low in step S110.

In step S130, the notification unit 174 notifies the user that the beacons BC should be installed in the region R2 in response to the determination in step S120 that it is necessary to install the beacons BC. The contents of the notification indicate the installation position of the beacons BC based on the results of calculation by the calculation unit 173. The distance between two adjacent beacons BC may be determined on the basis of the information i3 indicating the work accuracy. The installation position of the beacons BC may be in the region R1 (see FIG. 2), in the region R2 (see FIG. 3), or at a boundary portion between the regions R1 and R2.

In step S140, it is determined whether a notification of completion of installation of the beacons BC has been received from the user via the terminal 3. When the notification of completion of installation of the beacons BC has been received, the process proceeds to step S150 to set the work machine 1 to the "ready" state and end the process in the flowchart. Otherwise, the process returns to step S140.

(Method for Executing Work)

Figure 5:
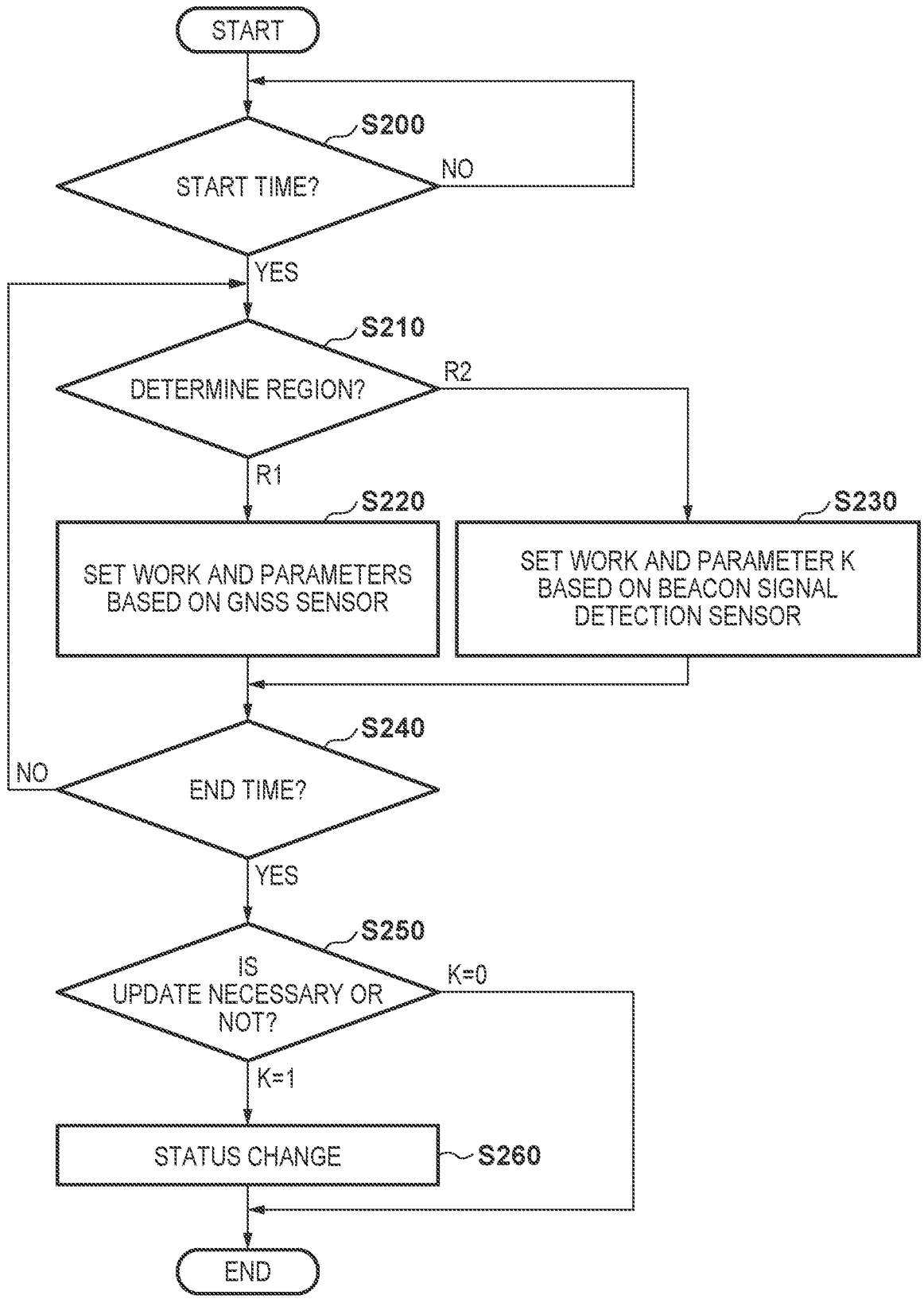
FIG. 5 is a flowchart illustrating an example of a method of working.

FIG. 5 is a flowchart illustrating an example of a method for executing work based on the installed beacons BC when the work machine 1 is in the "ready" state. The process in the flowchart is mainly implemented by the system controller 17, and the outline of the process is to perform work based on the results of detection by the GNSS sensor 15 in the region R1, and perform work based on the results of detection by the beacon signal detection sensor 16 in the region R2.

The work machine 1 can work by traveling in the work region WR on a predetermined route while driving the work unit 11. For example, the work machine 1 can work by repeating straight traveling and turning in an arbitrary direction in the work region WR. As another example, the work machine 1 may work by repeating reciprocations in the work region WR in a predetermined direction.

In step S200, it is determined whether it is the work start time has come on the basis of the information it indicating the work time. If the work start time has come, the process proceeds to S210 to start the work, and otherwise, the process returns to step S200.

In step S210, it is determined whether the self-position of the work machine 1 is in the region R1 or the region R2. In the case of the region R1, the process proceeds to step S220, and in the case of the region R2, the process proceeds to step S230. This determination may be made based on the detection intensity of the GNSS sensor 15.

In step S220, in the region R1, the work machine 1 performs work while specifying the self-position based on the results of detection by the GNSS sensor 15. In the region R1, the detection intensity of the GNSS sensor 15 is equal to or higher than the reference (see FIG. 4, step S110). Therefore, the work machine 1 can travel on a desired travel route based on the results of detection by the GNSS sensor 15. During the work, a parameter K (the initial value is set to 0) is used. If the detection intensity of the GNSS sensor 15 is equal to or higher than the reference, K is kept at 0. Otherwise (if the detection intensity of the GNSS sensor 15 is less than the reference), K is set to 1.

In step S230, the work machine 1 performs work in the region R2 while specifying the self-position based on the results of detection by the beacon signal detection sensor 16. In the region R2, the detection intensity of the GNSS sensor 15 is less than the reference (see FIG. 4, step S110). However, since the beacons BC are installed in the region R2, the work machine 1 can travel on a desired travel route based on the results of detection by the beacon signal detection sensor 16. During the work, if the detection intensity of the GNSS sensor 15 remains less than the reference, K is kept at 0. Otherwise (if the detection intensity of the GNSS sensor 15 is equal to or greater than the reference), K is set to 1.

That is, in the region R1, the work machine 1 travels and works while specifying the self-position in the region R1 with high accuracy by the GNSS sensor 15 (step S220). On the other hand, in the region R2, the work machine 1 works while detecting that the work machine 1 is traveling in the region R2 by the GNSS sensor 15 and specifying the self-position in the region R2 with high accuracy by the beacon signal detection sensor 16 (step S230).

In step S240, it is determined whether the work end time has come on the basis of the information i1 indicating the work time. If the work end time has come, the process proceeds to step S250, and otherwise, the process returns to step S210.

In step S250, the determination unit 175 determines whether it is necessary to update the regions R1 and R2 on the basis of the above-described parameter K. If K=0, the process in the flowchart is ended while the work machine 1 remains in the "ready" state. On the other hand, if K=1, the process proceeds to step S260 to set the work machine 1 to the "preparatory" state, notify the user of the setting, and end the process in the flowchart. By setting the work machine 1 to the "preparatory" state, the installation position of the beacons BC is corrected on the basis of the process in the flowchart of FIG. 4. From this viewpoint, the parameter K can also be referred to as a flag for determining the necessity of updating the regions R1 and R2.

As described above, according to the present embodiment, the work machine 1 includes the specification unit 172 and the notification unit 174. The specification unit 172 specifies the region R2 in which the detection intensity of the GNSS signal by the GNSS sensor 15 is less than the reference in the work region WR. The notification unit 174 notifies the user that the beacons BC should be installed in the specified region R2. When the beacons BC are installed in response to the notification, the work machine 1 can perform work while detecting signals of the beacons BC by the beacon signal detection sensor 16 in the region R2. That is, at the time of execution of work, the work machine 1 travels based on the results of detection by the GNSS sensor 15 in the region R1 where the detection intensity of the GNSS sensor 15 is equal to or greater than the reference, and travels based on the results of detection by the beacon signal detection sensor 16 in the region R2. As a result, the work machine 1 can perform work while specifying the self-position with high accuracy in any portion of the work region WR, thereby achieving improvement in work efficiency. In the present embodiment, the accuracy of specifying the self-position conforms to the detection intensity of the GNSS signal. In another embodiment, the self-position may be specified on the basis of other factors such as the number of captured satellites serving as the transmission sources of the GNSS signal.

In the embodiment, the system controller 17 is provided in the work machine 1, but in another embodiment, some or all of the functions of the system controller 17 may be implemented by the information management apparatus 2. That is, the information management apparatus 2 can specify or update the regions R1 and R2, determine or update the installation positions of the beacons BC, and notify of them (steps S110, S130, and S260).

In the above description, for ease of understanding, each element has been given a name related to its functional aspect. Meanwhile, each element is not limited to one having, as a main function, the function described in the embodiment, and may be one having the function as an auxiliary function.

<Summary of Embodiments>

A first aspect relates to a work machine (for example, 1). The work machine includes a GNSS sensor (for example, 15) configured to detect a GNSS signal, and a beacon signal detection sensor (for example, 16) configured to detect a signal of a beacon (for example, BC). The work machine is a self-propelled work machine that performs work in a work region (for example, WR) based on results of detection by the GNSS sensor and the beacon signal detection sensor. The work machine includes: a specification unit (for example, 172) configured to specify a region (for example, R2) in which accuracy of specifying a self-position of the work machine based on the GNSS sensor is lower than a reference in the work region; and a notification unit (for example, 174) configured to notify a user of an installation position of a marker based on a result of specification by the specification unit. When the user installs the beacon in response to the notification, the work machine can perform work while detecting the signal of the beacon in the region where the detection intensity of the GNSS signal is relatively low. As a result, the work machine can specify the self-position with high accuracy in any portion of the work region, thereby achieving improvement in work efficiency.

In a second aspect, when, out of the work region, a region in which detection intensity of the GNSS signal detected by the GNSS sensor is higher than the reference is defined as a first region, and a region in which the detection intensity is lower than the reference is defined as a second region, the installation position of the marker is in at least one of the first region, the second region, and a boundary portion between these regions. That is, the marker may be installed in any region as long as any position in the second region can be specified.

In a third aspect, the specification unit specifies a region in which detection intensity of the GNSS signal detected by the GNSS sensor is lower than the reference. The first aspect can be implemented relatively easily.

In a fourth aspect, the work machine further includes a traveling unit (for example, 13) configured to cause the work machine to travel; and a traveling control unit (for example, 14) configured to control driving of the traveling unit. When out of the work region, a region in which the detection intensity is equal to or higher than the reference is defined as a first region (for example, R1), and a region in which the detection intensity is lower than the reference is defined as a second region (for example, R2), at the time of execution of the work, the traveling control unit controls driving of the traveling unit based on the result of detection by the GNSS sensor in the first region and based on the result of detection by the beacon signal detection sensor in the second region. As a result, the first aspect can be implemented relatively easily.

In a fifth aspect, before the start of execution of the work, the traveling control unit causes the work machine to travel in the work region by the traveling unit, and during that time, the specification unit specifies the second region. After the specification of the second region, the user can install the beacon at the corresponding position, and thereafter (for example, at the time of execution of the work), the first aspect can be implemented.

In a sixth aspect, the work machine further includes a calculation unit (for example, 173) configured to calculate a position where the beacon is to be installed, and the calculation unit determines the position in the first region. Since the beacon is installed in the first region where the detection intensity of the GNSS signal is relatively high, the work machine can calculate or specify the self-position on the basis of the signal of the beacon.

In a seventh aspect, the work machine further includes a calculation unit (for example, 173) configured to calculate a position where the beacon is to be installed, and the calculation unit determines the position in the second region. That is, the installation position of the beacon may be determined on the basis of the first region where the detection intensity of the GNSS signal is relatively high. According to this aspect as well, the same advantageous effects as those of the sixth aspect can be realized.

In an eighth aspect, the work machine further includes an acquisition unit (for example, 171) configured to acquire work information from the user, the work information includes information (for example, i3) indicating work accuracy, and the calculation unit determines omission of installation of the beacon on the basis of the work accuracy. That is, if the work accuracy designated by the user is relatively low, the work machine does not need to specify the self-position with high accuracy. Therefore, according to the eighth aspect, unnecessary installation of the beacons can be omitted.

In a ninth aspect, the work machine further includes an acquisition unit (for example, 171) configured to acquire work information from the user, the work information includes information (for example, i3) indicating work accuracy, and the calculation unit sets the reference on the basis of the work accuracy. This makes it possible to achieve advantageous effects similar to those of the eighth aspect.

In a tenth aspect, the work machine further includes a determination unit (for example, 175) configured to determine necessity of updating the specified region, and in a case where the determination unit determines that the specified region needs to be updated at the time of execution of the work, the notification unit notifies the user of the determination. According to the tenth aspect, for example, if an installation object is provided later in the work region, the installation position of the beacon can be changed.

In an eleventh aspect, at least three units of the beacon are installed. As a result, the first aspect can be implemented relatively easily.

A twelfth aspect relates to an information management apparatus (for example, 2). The information management apparatus is communicable with a self-propelled work machine (for example, 1) that performs work in a work region (for example, WR) on the basis of results of detection by a GNSS sensor (for example, 15) and a beacon signal detection sensor (for example, 16), and manages work information of the work machine. The GNSS sensor is capable of detecting a GNSS signal, the beacon signal detection sensor is capable of detecting a signal of a beacon (for example, BC), and the information management apparatus includes: a specification unit (for example, S110) configured to specify a region in which accuracy of specifying a self-position of the work machine based on the GNSS sensor is lower than a reference in the work region; and a notification unit (for example, S130) configured to notify a user of an installation position of a marker based on a result of specification by the specification unit. Thus, advantageous effects similar to those of the first aspect can be obtained.

The invention is not limited to the foregoing embodiments, and various variations/changes are possible within the spirit of the invention.

What is claimed is:

1. A work machine which includes a global navigation satellite system (GNSS) sensor that detects a GNSS signal and a beacon signal detection sensor that detects a signal of a beacon, and which is a self-propelled work machine that performs work in a work region based on results of detection by the GNSS sensor and the beacon signal detection sensor, the work machine comprising:
   a traveling unit configured to cause the work machine to travel;
   at least one processor circuit with a memory comprising instructions, that when executed by the processor circuit, cause the at least one processor circuit to:
   control driving of the traveling unit;
   acquire, from a user, work information at least indicating a work accuracy;
   specify, among the work region, a region in which accuracy of specifying a self-position of the work machine based on the GNSS sensor is lower than a reference accuracy corresponding to the work accuracy; and
   notify the user of an installation necessity of the beacon based on a result of specification of the region,
   before executing the work, set a predetermined parameter that indicates whether it is necessary to update each specified region, and
   while executing the work,
      change the parameter from its initial value, in a case where the accuracy of the specifying the self-position of the work machine based on the GNSS sensor is lower than the reference accuracy in the first region, and
      determine that each specified region needs to be updated in a case where the parameter is changed, wherein,
   the GNSS sensor detects the GNSS signal as detection intensity of each region among the work region,
   the specifying the region further comprises:
      setting a reference intensity based on the work accuracy,
      specifying a region in which the detection intensity is equal to or higher than the reference intensity as a first region, and
      specifying a region in which the detection intensity is lower than the reference intensity as a second region,
   in a case of executing the work, the driving of the traveling unit is controlled (i) based on the result of detection by the GNSS sensor in the first region, and (ii) based on the result of detection by the beacon signal detection sensor in the second region, and
   after a work end time, the instructions, when executed by the at least one processor circuit, further cause the at least one processor circuit to determine whether each specified region needs to be updated (iii) based on the result of detection by the GNSS sensor in the first region, and (iv) based on the result of detection by the beacon signal detection sensor in the second region, and, in a case where at least one region needs to be updated, to send to the user map data indicating a position where a beacon newly needs to be installed.

2. The work machine according to claim 1, wherein, the installation position of the marker is in at least one of the first region, the second region, and a boundary portion between these regions.

3. The work machine according to claim 1, wherein the instructions, when executed by the processor circuit, further cause the at least one processor circuit to:
   before the start of execution of the work, cause the work machine to travel the work region by the travel unit, and during that time, the second region is specified.

4. The work machine according to claim 1, wherein the instructions, when executed by the processor circuit, further cause the at least one processor circuit to:
   calculate a position where the beacon is to be installed, wherein
   the position is determined in the first region.

5. The work machine according to claim 1, wherein the instructions, when executed by the processor circuit, further cause the at least one processor circuit to:
   calculate a position where the beacon is to be installed, wherein
   the position is determined in the second region.

6. The work machine according to claim 4, wherein the instructions, when executed by the processor circuit, further cause the at least one processor circuit to:
   determine omission of installation of the beacon on the basis of the work accuracy.

7. The work machine according to claim 1, wherein at least three of the beacons are installed.

8. The work machine according to claim 1, wherein the at least one processor circuit further executes, while executing the work, changing the parameter from the initial value, in a case where the result of detection by the beacon signal detection sensor is lower than another reference in the second region.

* * * * *